(12) United States Patent  (10) Patent No.: US 7,519,389 B2
Mizumaki et al.  (45) Date of Patent: *Apr. 14, 2009

(54) DISPLAY DEVICE AND DISPLAY SYSTEM

(75) Inventors: Hidetaka Mizumaki, Nara (JP);
Katsuya Mizukata, Osaka (JP);
Yasukuni Yamane, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/964,177

(22) Filed: Dec. 26, 2007

(65) Prior Publication Data

US 2008/0108309 A1 May 8, 2008

Related U.S. Application Data

(63) Continuation of application No. 10/312,899, filed as application No. PCT/JP01/04683 on Jun. 1, 2001, now Pat. No. 7,454,228.

(30) Foreign Application Priority Data

Jun. 30, 2000 (JP) ............................. 2000-197669

(51) Int. Cl.
*H04M 1/00* (2006.01)

(52) U.S. Cl. ..................... 455/550.1; 455/566; 455/574; 345/619; 345/98; 345/211; 345/8; 345/589; 340/636.1

(58) Field of Classification Search ................. 455/566, 455/574, 550.1; 345/619, 98, 211, 8, 589; 340/636.1

See application file for complete search history.

(56) References Cited

U.S. PATENT DOCUMENTS 5,243,382 A 9/1993 Takano et al.

(Continued)

FOREIGN PATENT DOCUMENTS

CN 339890 9/1998

(Continued)

OTHER PUBLICATIONS

Telecommunication, vol. 17, No. 6, Kabushiki Kaisha Ric Telecom, May 25, 2000, pp. 76-79.

(Continued)

*Primary Examiner*—Meless N Zewdu
*Assistant Examiner*—Pierre-Louis Desir
(74) *Attorney, Agent, or Firm*—David G. Conlin; Steven M. Jensen; Edwards Angell Palmer & Dodge LLP

(57) ABSTRACT

The display system of the present invention includes: a body unit (1) for transmitting image data that has been generated; and a display device (2) for displaying an image in accordance with the image data that has been transmitted from the body unit (1), and said display system is characterized in that the body unit (1) and the display device (2) perform communications via radio communication means, and the body unit (1) and the display device (2) are separately providable. Thus, the radio transmission is used as communication means, and there is no cable, connecting the display device (2) and the body unit (1), that transfers the data signal, so that the device user can operate the system freely while watching the display device (2). As a result, it is possible to improve the workability of the user of the present display system. Further, since there is no wire connection section, using a connection clip, that is provided in a conventional display device, it is possible to simplify a mechanism for securing the strength of the wire connection section.

13 Claims, 8 Drawing Sheets

U.S. PATENT DOCUMENTS

| | | | |
|---|---|---|---|
| 5,455,657 | A | 10/1995 | Takeda |
| 5,581,492 | A | 12/1996 | Janik |
| 5,844,824 | A | 12/1998 | Newman et al. |
| 5,889,604 | A | 3/1999 | Hayashi |
| 6,073,034 | A | 6/2000 | Jacobsen et al. |
| 6,172,657 | B1 | 1/2001 | Kamakura et al. |
| 6,232,937 | B1 | 5/2001 | Jacobsen et al. |
| 6,323,775 | B1 | 11/2001 | Hansson |
| 6,417,861 | B1 | 7/2002 | Deering et al. |
| 6,486,862 | B1 | 11/2002 | Jacobsen et al. |
| 6,501,968 | B1 | 12/2002 | Ichimura |
| 2001/0017604 | A1 | 8/2001 | Jacobsen et al. |
| 2001/0043166 | A1 | 11/2001 | Jacobsen et al. |
| 2001/0043174 | A1 | 11/2001 | Jacobsen et al. |
| 2002/0057236 | A1 | 5/2002 | Jacobsen et al. |

FOREIGN PATENT DOCUMENTS

| | | |
|---|---|---|
| EP | 0 809 172 | 11/1997 |
| JP | 4-66643 | 6/1992 |
| JP | 08-205016 | 8/1996 |
| JP | 09-319558 | 12/1997 |
| JP | 10-133840 | 5/1998 |
| JP | 10-289034 | 10/1998 |
| JP | 2000-148290 | 5/2000 |
| JP | 2001-022681 | 1/2001 |
| KR | 1988-3744 | 4/1988 |
| KR | 1997-0049301 | 7/1997 |
| KR | 10-0252106 | 4/2000 |
| TW | 399194 | 7/2000 |

OTHER PUBLICATIONS

Internet Magazine, No. 66, Kabushiki Kaisha Impress, Jun. 2, 2000, pp. 194-195.

DISPLAY DEVICE AND DISPLAY SYSTEM

CROSS-REFERENCE TO RELATED APPLICATION(S)

This application is a continuation of copending application Ser. No. 10/312,899 filed on Dec. 30, 2002, which is the National Phase entry of PCT International application no. PCT/JP01/04683 filed on Jun. 1, 2001, which claims priority to Japanese application no. 2000-197669 filed on Jun. 30, 2000, the disclosures of which are expressly incorporated herein by reference.

TECHNICAL FIELD

The present invention relates to a display device and a display system of a computer in which a display device is separated from a body unit, and particularly relates to a display device and a display system of a so-called wearable computer of a mobile type, in which a display device is connected to a body unit or an operation unit via a radio transmission.

BACKGROUND ART

A typical computer system includes: an operation unit by which a device user inputs data and the like; a body unit for processing and storing data, and for generating display data and the like; and a display device for displaying the display data.

It is typical that data is inputted via the operation unit by performing keyboard input or voice input. Further, the body unit includes: a CPU (Central Processing Unit) for processing data; an HD (Hard Disk) for storing a large quantity of data; a memory required in processing data; a graphic card for generating display data, and the like. In a case where the display device is a little-space-occupation type, it includes: a liquid crystal panel; a signal conversion section for driving liquid crystal; a liquid crystal back light; and an inverter of the back light.

Recently, devices have been miniaturized, so that mobile type computer systems represented by a notebook computer have been being more widely used. In the future, the devices will be further miniaturized and made lighter, and it is expected that a so-called wearable computer whose body unit, operation unit section, and display device are separately provided will be in practical use.

For example, Japanese Unexamined Patent Publication No. 289034/1998 (Tokukaihei 10-289034)(Publication date: Oct. 27, 1998) discloses a mobile type computer such that: an HMD (Head Mounted Display) is employed as a display section, and a body unit is fixed on a waist of a device user, and the HMD is connected to the body unit via a fiber optics, and the fiber optics is substituted for a heavy cable so as to improve the workability.

Further, Japanese Unexamined Patent Publication No. 148290/2000 (Tokukai 2000-148290)(Publication date: May 26, 2000) discloses a technique such that: the HMD and a display watch are employed as the display device, and devices such as a control device containing a CPU, a memory device etc. containing a memory and an HD are connected to each other via a connection clip which connects micro conductors sewn into cloths, and a body of the device user is free from annoying cables, thus enabling natural movement.

However, although the conventional wearable computer system is realized by substituting the fiber optics for electric wires or by sewing the electric wires into cloths so as to improve the workability and secure the natural movement, the light fiber optics substituted for the conventional heavy wire is a physical line, so that the physical line intervenes between the HMD and the body unit, so that the workability is not necessarily preferable.

Further, in the conventional system, it takes trouble to connect the cloths each other by means of the connection clip even though the electric wires are sewn into the cloths, so that there occur the following problems: it is impossible to freely put on and take off the cloths, and it is necessary to use special cloths in which the electric wires have been sewn.

Further, it is necessary to display the content without largely deteriorating the content displayed in an ordinary computer so that the device user works while referring to the display device and uses the computer system at a desired time and place. However, this is not realized by the conventional system.

DISCLOSURE OF THE INVENTION

The object of the present invention is to provide a display device and a display system that can prevent the display content from largely deteriorating, and particularly can exclude physical wires between a display device and a body unit or an operation unit, and can improve the workability of a device user, and can secure freedom in selecting cloths.

The display system of the present invention includes: a body unit for transmitting display data that has been generated; and a display device for performing display in accordance with the display data that has been transmitted from the body unit, and said display system is characterized in that the body unit and the display device perform communications via radio communication means, and the body unit and the display device are separately wearable.

According to the arrangement, the radio transmission is used as communication means, and there is no cable, connecting the display device and the body unit, that transfers the display data, so that the device user can operate the system freely while watching the display device. As a result, it is possible to improve the workability of the user of the present display system. Further, since there is no wire connection section, using a connection clip, that is provided in a conventional display device, it is possible to simplify a mechanism for securing the strength of the wire connection section.

The display system of the present invention includes: a body unit for transmitting display data that has been generated; and a display device for performing display in accordance with the display data that has been transmitted from the body unit, and said display system is characterized in that the body unit and the display device perform communications via radio communication means, and the body unit and the display device are separable.

According to the arrangement, the radio transmission is used as communication means, and there is no cable, connecting the display device and the body unit, that transfers the display data, so that it is possible to more freely position the display device and the body unit.

Further, it is more preferable that the display data is transmitted from the body unit so that: the display data is not subjected to a complicated process in the display device, and the display can be performed.

Thus, it is not necessary to provide a complicated processing circuit on the display device, so that it is possible to simplify the arrangement of the display device, and it is possible to miniaturize the display device and to make the display device lighter. Thus, it is possible to improve the workability of the device user compared with a conventional system.

Further, it is more preferable that the display device includes: a receiving section for receiving the display data that has been transmitted from the body unit via the radio communication means; and a control section for providing a display signal to a display panel in accordance with the display data that has been received, and for controlling the receiving section.

Thus, since there is no wire connection section, using a connection clip, that is provided in a conventional display device, it is possible to simplify a mechanism for securing the strength of the wire connection section.

Further, it is more preferable that the display device includes a transmitting section for causing the control section to evaluate a display condition of the display panel, so as to feedback an evaluation result to the body unit via the radio communication means.

Thus, in a case where the transfer speed of the display data transmitted from the body unit is higher than a transfer speed at which the display data is displayed, the transmission from the body unit is temporarily stopped and is started again, so that it is possible to keep the most appropriate display condition.

Further, it is more preferable that the transmitting section transmits a predefined condition for performing display in the display panel to the body unit via the radio communication means.

Thus, the predefined condition for performing display and the present condition under which display is created in the display panel are transmitted to the body unit, so that it is possible to confirm whether or not to rectify the display condition by comparing both the conditions. Thus, it is possible to keep the most appropriate display condition.

Further, it is more preferable that a pixel array is provided on a surface of one of panels constituting the display panel, and the pixel array is constituted of a low temperature process polycrystal silicon TFT element.

Thus, the low temperature polycrystal silicon TFT is an element having a high driving force, so that it is possible to integrally form the signal line driving circuit and the scanning line driving circuit on a surface of the panel in the same process.

Further, it is more preferable that the display panel itself includes a memory function.

Thus, in a case where ferroelectric liquid crystal having a memory function is used in the display device, it is not necessary to transmit the display signal at a constant cycle, and it is not necessary to regularly refresh the image, so that it is possible to reduce the power consumption.

Further, it is more preferable that the display device includes an operation unit, and operation content of the operation unit is transmitted via the radio communication means to the body unit.

Thus, when a display control signal for controlling brightness and contrast etc. of the display device is transmitted not from the body unit but directly from the operation unit, the signal does not pass through the body unit, so that it is possible to realize the power saving in the body unit. Further, the operation condition of the operation unit is displayed in the screen of the display device as a menu, and operations are performed in accordance with the menu, so that the user can operate the display device without watching the operation unit. As a result, it is possible to improve the operationality of the operation unit.

Further, it is more preferable that the display device includes storage means for storing the display data.

Thus, it is not necessary to transmit the display data from the body unit to the display device at a constant cycle, so that it is possible to reduce the power consumption of the display device.

Further, it is more preferable that the control section detects a power capacity of a driving power source so as to transmit power capacity information to the body unit, and the body unit determines an amount of the display data, that is to be transmitted to the display device, in accordance with the power capacity information.

Thus, it is possible to determine the amount of the display data that is to be transmitted to the display device in accordance with the information of the power capacity. That is, when the power capacity of the display device is small, the amount of the display data that is to be transmitted to the display device is made smaller than an ordinary state so as to be transmitted. Thus, it is possible to prolong an display data renewal period at a frame or a bit unit of the display panel on the display device, so that it is possible to reduce power required in the display device.

Further, it is more preferable that the radio communication means is constituted in accordance with specifications of Bluetooth (trade name).

Thus, it is possible to arrange Bluetooth by using moderately priced parts, and a receiving/transmitting device based on Bluetooth can switch between master and slave freely, so that the display device can be connected to the body unit and/or the operation unit. As a result, these parts can control each other. Thus, for example, the operation unit can control both the body unit and display device, and the display data can be transmitted from the body unit to the display device.

The display device of the present invention includes a display panel for displaying display data, and said display device is characterized by including: a receiving section for receiving the display data displayed in the display panel via radio transmission; and a control section for providing a signal to the display panel in accordance with the display data that has been received, and for controlling the receiving section.

According to the arrangement, radio transmission is used as the communication means, and there is no cable that transfers the display data to the vicinity of the display device, so that the user of the device can operate the system freely while watching the display device. As a result, it is possible to improve the workability. Further, since there is no wire connection section for performing connection by means of a connection clip of a conventional display device, it is possible to simplify a conventional mechanism for securing the strength of the wire connection section. Further, the display data is transmitted in such format that the display data can be displayed as it is, so that the display device merely displays the display data as it is without processing the display data. As a result, it is not necessary to perform a special operation such as data format conversion etc. Thus, it is possible to simplify the control section contained in the display device, and it is possible to miniaturize the display device and to make the display device lighter.

Further, it is more preferable that the control section includes a transmitting section for transmitting a display condition of the display panel and a predefined condition for performing display via the radio transmission.

Thus, the display condition of the display panel is evaluated, and the evaluation result is transmitted to the body unit, and the condition is compared with the predefined condition for performing display, that has been transmitted, so that it is possible to prevent disarrangement of the display that is brought about by receiving excessive display data, and to prevent the display content from largely deteriorating.

Further, it is more preferable that the control section detects a power capacity of the display device, so as to transmit information of the power capacity, that has been detected, via the radio transmission.

Thus, it is possible to determine the amount of the display data that is to be transmitted to the display device in accordance with the information of the power capacity. That is, when the power capacity of the display device is small, the amount of the display data that is to be transmitted to the display device is made smaller than an ordinary state so as to be transmitted. Thus, it is possible to prolong a display data renewal period at a frame or a bit unit of the display panel on the display device, so that it is possible to reduce power required in the display device.

Further, it is more preferable that the display device further includes an operation unit, wherein the control section transmits operation content of the operation unit via the radio transmission.

Thus, when a display control signal for controlling brightness and contrast etc. of the display device is transmitted not from the body unit but directly from the operation unit, the display control signal does not pass through the body unit, so that it is possible to realize the power saving in the body unit. Further, the operation condition of the operation unit is displayed in the screen of the display device as a menu, and operations are performed in accordance with the menu, so that the user can operate the display device without watching the operation unit. As a result, it is possible to improve the operationality of the operation unit.

The display system of the present invention includes: a body unit for generating display data; and a display device for displaying the display data from the body unit, wherein the body unit and the display device are separated from each other, and said display system is characterized in that the body unit and the display device are connected to each other by radio communication means.

According to the arrangement, the body unit is separated from the display device, and both the devices are connected to each other via the radio communication means, so that there is no cable for transferring the display data to the vicinity of the display device. Thus, the device user can perform operations more freely while watching the display device compared with a conventional system, and it is possible to improve the workability of the device user. Further, since the body unit is separated from the display device, the device user can operates the system more smoothly by fixing the body unit whose weight is comparatively heavy on the user's waist and by placing the light display device on a position desired by the user. As a result, it is possible to further improve the workability.

Further, it is more preferable that the display device includes: a display panel for displaying the display data; a receiving section for receiving the display data transmitted from the body unit; and a control section for controlling the receiving section and a display panel.

Thus, since a wire connection section for performing clip connection is not provided on the display device, it is possible to simplify a conventional mechanism for securing the strength of the wire connection section. Further, the display data transmitted from the body unit is displayed as it is, and the body unit performs a special operation such as data format conversion etc., so that it is possible to simplify the control section contained in the display device, and it is possible to miniaturize the display device and to make the display device lighter.

Further, it is more preferable that the display device includes: a display panel for displaying the display data; a receiving section for receiving the display data transmitted from the body unit; and a transmitting section for controlling the receiving section and the display panel so as to transmit a display condition of the display panel or a predefined condition for performing display via radio transmission.

Thus, since there is no wire connection section of the display device, it is possible to simplify a conventional mechanism for securing the strength of the wire connection section. Further, the display device merely displays the display data, transmitted from the body unit, and the body unit performs a special operation such as data format conversion etc. Thus, it is possible to simplify the control section contained in the display device, and it is possible to miniaturize the display device and to make the display device lighter. Further, the display condition of the display panel is evaluated, and the evaluation result is transmitted (fedback) to the body unit, and the condition is compared with a predefined condition for performing display, that has been transmitted, so that it is possible to prevent disarrangement of the display that is brought about by receiving excessive display data, and to prevent the display content from largely deteriorating.

The display system of the present invention includes: a body unit for generating display data; a display device displaying the display data from the body unit; and an operation unit by which a device user inputs data to the body unit or the display device, wherein the body unit, the display device, and the operation unit are separated from each other, and said display system is characterized in that the display device is connected to the body unit and/or the operation unit via radio communication means.

According to the arrangement, the body unit, the display device, and the operation unit by which the device user performs input are separated from each other, and both the devices are connected to each other via the radio communication means, so that there is no cable for transferring the display data to the vicinity of the display device. Thus, the device user can perform operations freely while watching the display device, so that it is possible to improve the workability of the device user. Further, the body unit whose weight is comparatively heavy can be fixed on the user's waist and the light display device can be placed on a position desired by the user, so that the device user can operates the system more smoothly. As a result, it is possible to improve the workability. Further, it is possible to place the operation unit on a position desired by the device user, so that the operability is improved. The operation unit not only controls the body unit, but also directly controls the display device not via the body unit, so that it is possible to improve a reaction speed in changing display.

The display system of the present invention includes: a body unit for generating display data; and a display device for displaying the display data from the body unit, wherein the body unit and the display device are separated from each other, and the body unit and the display device are connected to each other by radio communication means, and said display system is characterized in that a control section provided in the display device detects a power capacity of the display device, and transmits information of the power capacity, that has been detected, via radio transmission, and the body unit changes a transfer rate of the display data in response to the information.

According to the arrangement, it is possible to determine the amount of the display data that is to be transmitted to the display device in accordance with the information of the power capacity. That is, when the power capacity of the display device is small, the amount of the display data that is to be transmitted to the display device is made smaller than an ordinary state so as to be transmitted. Thus, it is possible to prolong a display data renewal period at a frame or a bit unit of the display panel on the display device, so that it is possible to reduce power required in the display device.

The display system of the present invention includes: a body unit for generating display data; and a display device for displaying the display data from the body unit, wherein the body unit and the display device are separated from each other, and the body unit and the display device are connected to each other by radio communication means, and said display system is characterized in that the display device includes an operation unit, and a control section transmits operation content of the operation unit via radio transmission, so as to operate the body unit.

According to the arrangement, when a display control signal for controlling brightness and contrast etc. of the display device is transmitted not from the body unit but directly from the operation unit, the control signal does not pass through the body unit, so that it is possible to realize the power saving in the body unit. Further, the operation condition of the operation unit is displayed in the screen of the display device as a menu, and an operation is performed in accordance with the menu, so that the user can operate the display device without watching the operation unit. As a result, it is possible to improve the operationality of the operation unit.

It is more preferable that the radio communication means is constituted in accordance with specifications of Bluetooth.

Thus, the radio communication means is arranged based on the specifications of Bluetooth, so that it is not necessary to provide a cable in the vicinity of the display section due to bi-directional electric wave radio transmission/reception, thus improving the workability. Corresponding to the display condition of the display device, the display signal is transmitted from the body unit, so that the display content does not largely deteriorate. Further, it is possible to arrange Bluetooth by using moderately priced parts, and the transferring speed is made higher in the future. Thus, the reception and transmission of the display data can be realized by using the radio communication means. Further, it is possible to switch the receiving/transmitting device, based on Bluetooth, between master and the slave, so that it is possible to connect the display device to the body unit and/or the operation unit, so as to cause them to control each other. For example, the operation unit can control both the body unit and the display device, and the display data can be transmitted from the body unit to the display device.

For a fuller understanding of the nature and advantages of the invention, reference should be made to the ensuing detailed description taken in conjunction with the accompanying drawings.

DESCRIPTION OF THE EMBODIMENTS

The following descriptions will further detail the present invention referring to embodiments and comparative examples, but the present invention is not limited thereby.

Embodiments of the present invention are described as follows.

Embodiment 1

One embodiment according to a display device and a display system of the present invention is described as follows based on FIG. 1 to FIG. 4.

Figure 1:
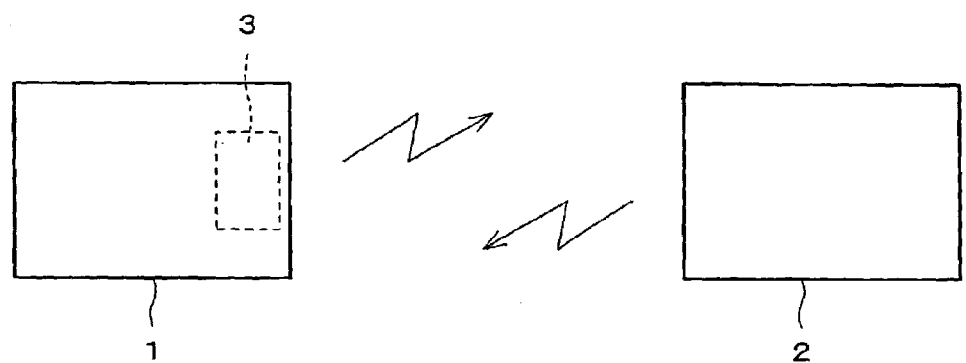
FIG. 1 is a diagram showing an arrangement of a display system of one embodiment of the present invention.

As shown in FIG. 1, the display system of the present embodiment includes two parts: a body unit 1 and a display device 2, and information is given and received between both the parts by radio transmission. As a basic operation, display data displayed in the display device 2 is transmitted from the body unit 1 to the display device 2 by the radio transmission.

Examples of the body unit 1 include a notebook PC, a hand-held PC, a pocket PC, a portable information terminal, and the like, each of which has a radio interface (radio communication means) 3 based on specifications of Bluetooth (trade name).

Note that, the Bluetooth is a radio communication technique, applied to portable information devices, that is being widely used. In a case of an early version using an electric wave of 2.4 GHz, it is possible to perform a communication at a speed of 1 Mbps when a distance between devices is within 10 m. Practically, the communication is performed at a speed of 721 kbps in a downward direction and at a speed of 57.6 kbps in an upward direction upon asymmetric transmission, and the technique is characterized in that it is possible to realize a circuit arrangement at lower cost and to miniaturize the circuit arrangement.

Further, unlike the conventional devices, it is not necessary that the body unit 1 has a display function therein, so that it is possible to largely miniaturize the body unit 1 by omitting the display function. Thus, the miniaturized body unit 1 can be mounted on (a) portable goods such as an attache case, a bag, a porch etc., (b) furniture that is often used, and (c) a car etc. that is a kind of transportation device.

The radio interface 3 provided in the body unit 1 is usually under a stand-by condition. When request information is transmitted to the body unit 1 via the radio interface 3, the body unit 1 transmits display data to the display device 2 via the radio interface 3.

For example, the following operation may be performed: when a power source of the display device 2 is turned ON, the request information is transmitted from the display device 2 to the body unit 1, and display data is transmitted from the body unit 1 to the display device 2 in response to the request information. Further, the following operation may be performed: when the power source of the body unit 1 is turned ON, the body unit 1 itself generates the request information spontaneously, and the display data is transmitted from the body unit 1 to the display device 2.

Adversely, in a case where a release signal is transmitted to the body unit 1 via the radio interface 3, the body unit 1 stops transmitting the display data to the display device 2.

The display data may be typical time-series display data, or may be in a format of HTML (Hyper Text Markup Language) or XML (Extensible Markup Language).

Since the display device 2 of the present embodiment does not have a frame memory, it is necessary to transmit the display data from the body unit 1 to the display device 2 at a constant cycle as in the typical display device. Note that, in a case where a display unit used as the display device 2 has a memory function like ferroelectric liquid crystal, it is not necessary to transmit the display signal at a constant cycle unlike the foregoing operation.

Here, an arrangement and an operation of the display device 12 are described.

Figure 2:
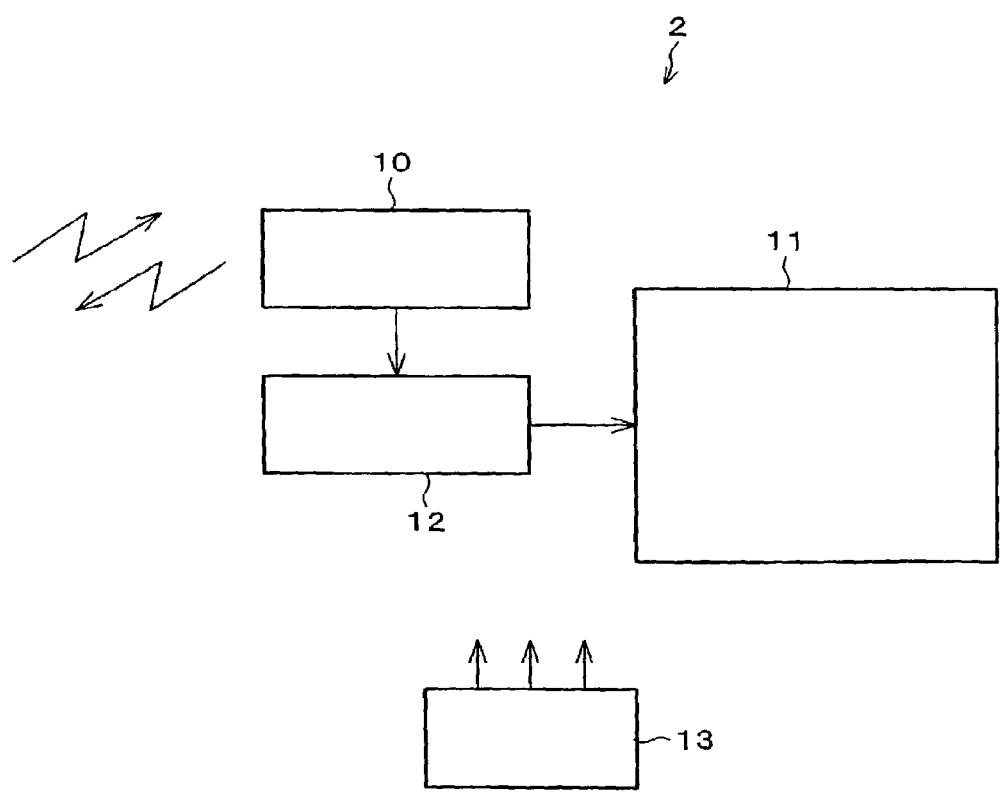
FIG. 2 is a diagram showing an arrangement of a display device of the display system shown in FIG. 1.

As shown in FIG. 2, the display device 2 includes not only the radio interface (radio communication means) 10 based on the specifications of Bluetooth, but also a display panel 11, a control section 12, a battery 13, and the like. In this manner, the arrangement of the display device 2 is extremely simple. A size and a weight of the display device 2 are determined according to mainly sizes and weights of the display panel 11 and the battery 13.

The display device 2 of the present embodiment is a display device in which the display panel 11 has comparatively small number of pixels. Further, a shape of the display device 2 is a watch type, or a pendant type, or an HMD type etc., so that it becomes easier to mount the display device 2 on cloths.

In a case where the display device 2 has only a function for displaying the display data transmitted from the body unit 1, the radio interface 10 may be constituted only of a receiving section having a receiving function. Thus, the arrangement of the radio interface 10 is simplified, so that it is possible to miniaturize the display device 2.

Figure 3:
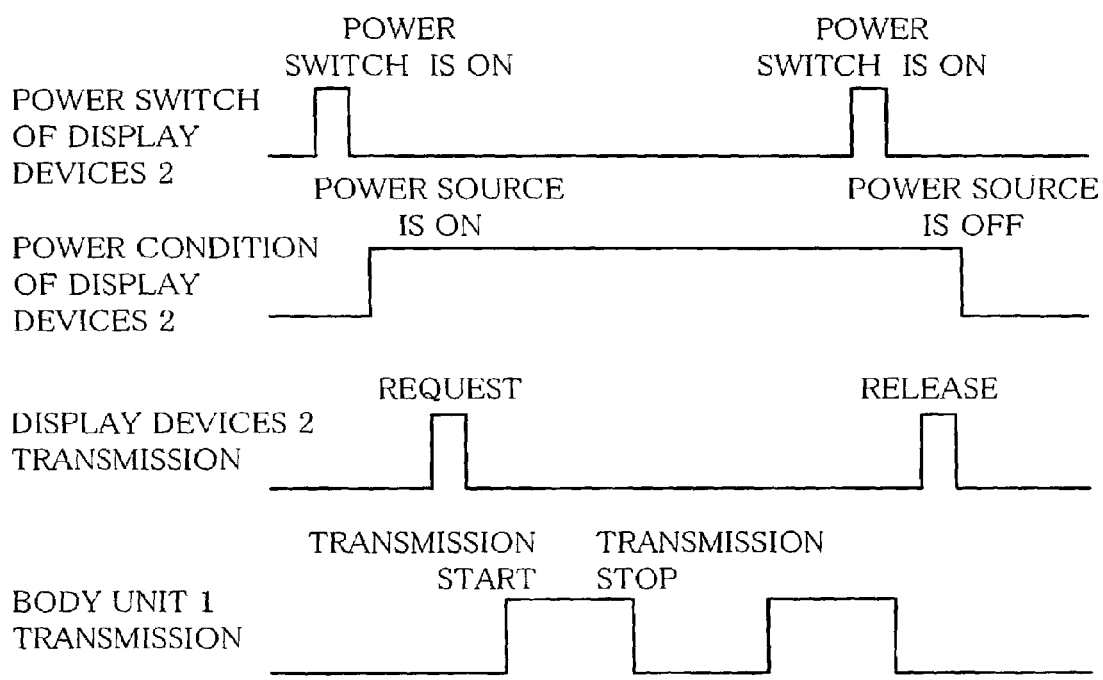
FIG. 3 is an explanatory drawing showing an example of timing at which transmission/reception is performed by the display device shown in FIG. 2.

As shown in FIG. 3, if the power source of the display device 2 is turned ON when its power source condition is OFF, first, the power source of the display device 2 itself is turned ON. Thereafter, the display device 2 transmits the request signal to the body unit 1 via the radio interface 10, and the display device 2 receives a transmission signal transmitted from the body unit 1 in response to the request signal. Adversely, if a power switch is turned OFF when the power source condition of the display device 2 is ON, the release signal, which indicates that the transmission signal is not required, is transmitted to the body unit 1 via the radio interface 10. Thereafter, the power source of the display device 2 itself is turned OFF.

Note that, FIG. 3 shows a procedure of mode setting performed based on the specifications of Bluetooth in a simplified manner. A procedure for generating such request/release signal is contained in the control section 12 shown in FIG. 2 as a power-on sequence and a power-off sequence.

When the display device 2 performs display, in response to the request signal from the display device 2, the display data is transmitted from the body unit 1 to the display device 2 in the display system of the present embodiment. In the display device 2, the display data is decoded by the control section 12 via the radio interface 10. Then, the data is developed as data which can be displayed in the display panel 11. Thereafter, the display data is displayed in the display panel 11 at a timing of display.

Figure 4:
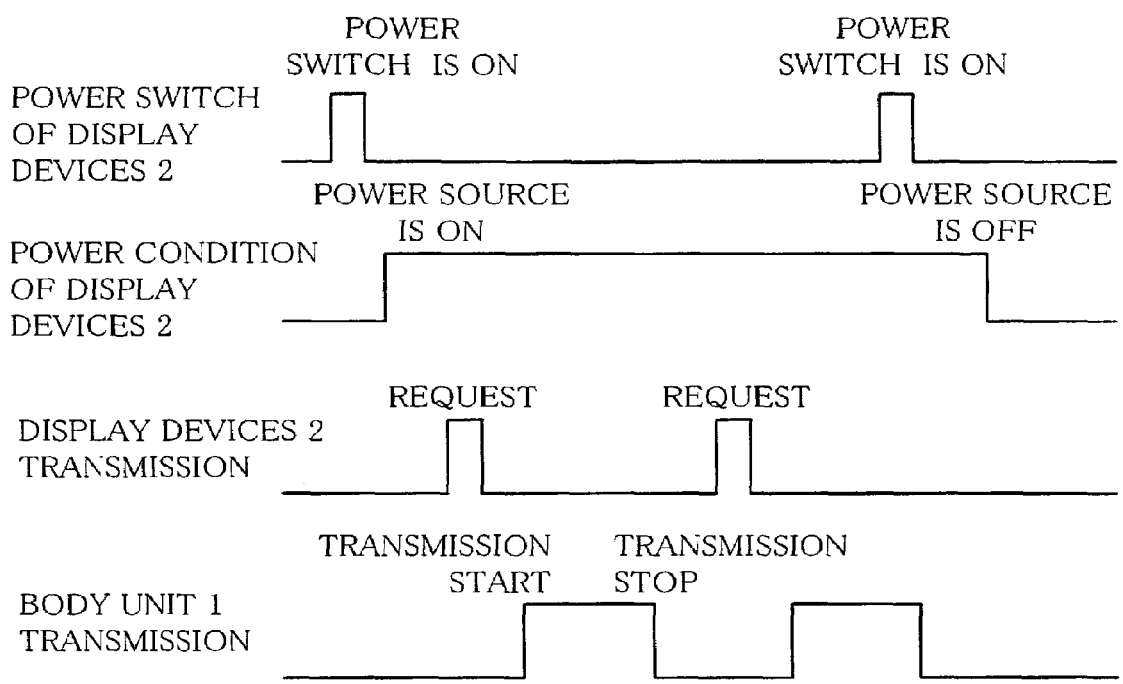
FIG. 4 is an explanatory drawing showing another example of timing at which transmission/reception is performed by the display device shown in FIG. 2.

Note that, a method for transmitting the request/release signal when the power source of the display device 2 is ON/OFF is not necessarily limited to the method described above. For example, as shown in FIG. 4, a method in which the request signal is transmitted at a constant cycle while the power source of the display device 2 is ON may be employed. At this time, in a case where the body unit 1 receives the request signal within a certain period, the body unit 1 continues to transmit the display data to the display device 2, and in a case where the body unit 1 does not receive the request signal even when the certain period has passed, the transmission of the display data is stopped.

Further, the following operation may be performed: the body unit 1 itself generates the request/release signal, or continues to transmit the display data to the display device 2 via the radio interface 3 regardless of the request/release signal. In this case, it is possible to make arrangement so that the radio interface 3 of the body unit 1 merely includes the transmission section having a transmitting function, and a radio interface 10 of the display device 2 merely includes a receiving section having a receiving function. Thus, it is possible to simplify the respective devices. Therefore, it is possible to miniaturize the device according to the display system so as to improve the workability of the user.

Further, in the display system of the present embodiment, the format of the display data transmitted from the body unit 1 to the display device 2 and displayed in the display panel 11 is processed by the body unit 1 so that it is not necessary to perform a special operation such as data format conversion etc. Thus, it is possible to realize an extremely simple arrangement such that the control section 12 of the display device 2 merely transmits the transmitted display data to the display panel 11 or switches the display data. Therefore, a special arithmetic circuit is not required in the control section 12, so that the control section 12 can be simplified. As a result, it is possible to miniaturize the display device 2 and to make the display device 2 lighter.

The display panel 11 is a reflection type TFT liquid crystal panel such that: a screen size is 2 inches, and a pixel arrangement is 160×RGB×120 pixels, 16 gray scales. The reflection type TFT liquid crystal panel is arranged in the same manner as in a conventional panel, and glass substrates or plastic substrates sandwich a liquid crystal layer, and one of the substrate has a pixel array thereon.

Figure 5:
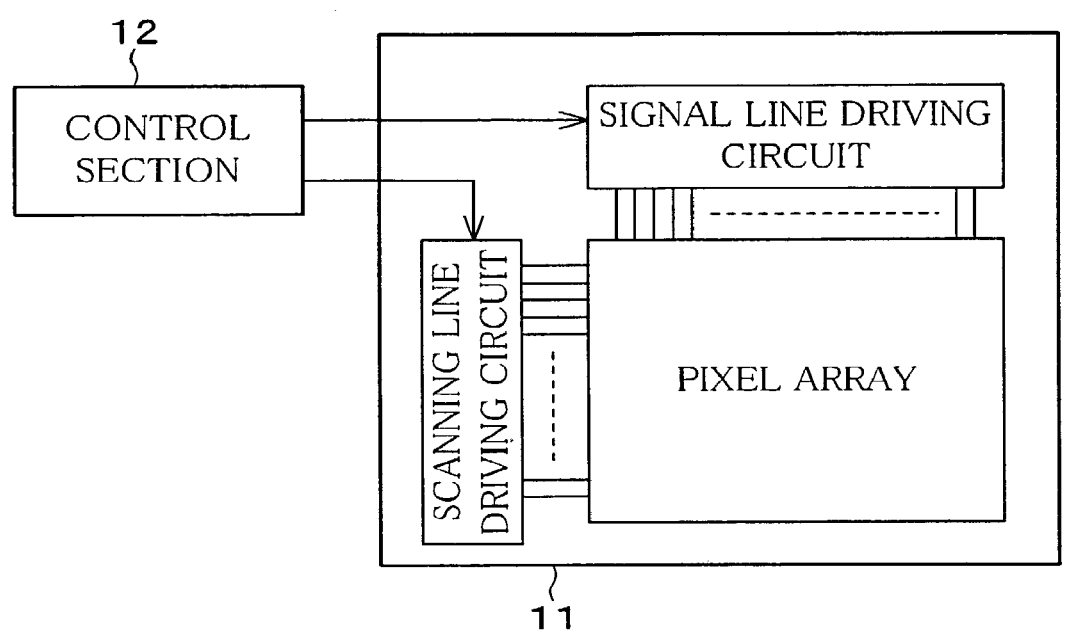
FIG. 5 is a diagram showing an arrangement of a display panel of the display device shown in FIG. 2.

As shown in FIG. 5, the pixel array is driven by a signal line driving circuit and a scanning line driving circuit. Particularly in a case where the pixel array is constituted of an element having a high driving force like a low temperature polycrystal silicon TFT element, it is possible to integrally form the signal line driving circuit and the scanning line driving circuit in the same process.

In order to drive the reflection type TFT liquid crystal panel at a vertical frequency of 60 Hz, a transfer speed of approximately 13 Mbps is required. Then, by performing low frequency driving etc. indicated in Japanese Unexamined Patent Publication No. 94034/2001 (Tokugan 2001-94034) applied by the present applicant, it is possible to curtail the required transfer speed. For example, when the vertical frequency is ½s, the transfer speed is approximately 0.5 Mbps. Thus, in a case where the time-series image data is transmitted, it is possible to realize display performed at a transfer speed based on the specifications of Bluetooth.

The control section 12 has a function as a display controller and a control function of the radio interface. The control section 12 basically develops the display data received by the radio interface 10 into displayable data. Thereafter, the control section 12 causes the display panel 11 to display the displayable data. The process performed by the control section 12 is entirely a digital process, so that it is possible to combine the process to a memory required in a midstream of the process so as to be contained in a single chip as an LSI.

In a case where the format of the display data transmitted from the body unit 1 has been converted into a format which can be displayed in the display panel 11 as described above, the control section 12 transmits the transmitted display data to the display panel 11 as it is. Further, when not only the display data but also a signal determining an operation timing of the display panel 11 is transmitted, the control section 12 performs a simpler operation. Further, when the radio interface 10 is constituted only of the receiving section having a communication function, the control section 12 does not require a complicated operation upon controlling the radio interface 10, so that the control section 12 has only to uniform timings of the display data transmitted from the body unit 1. Thus, the control section 12 is arranged in an extremely simple manner, so that it is possible to miniaturize the display device 2 and to make the display device 2 lighter. As a result, it is possible to improve the workability of the user wearing the display system 11.

Further, in the display system of the present embodiment, the radio interface 10 includes the transmitting section having a transmitting function and the receiving section having a receiving function, and receives the display data and evaluates a condition of the data displayed in the display panel 11 by means of the control section 12, and feedbacks the evaluation result via the radio interface 10 to the body unit 1. Thus, in a case where the transfer speed of the display data transmitted from the body unit 1 is higher than a transfer speed at which the display data is displayed in the display panel, the transmission from the body unit 1 is temporarily stopped and is started again, so that it is possible to keep the most appropriate display condition.

Further, the battery 13 supplies required power to the respective sections of the display device 2 such as the radio interface 10, the display panel 11, and the control section 12. A relationship between a weight and duration of the battery 13 is a trade-off relationship, so that it is necessary to select battery capacity suitable for purpose of use.

Note that, the display panel 11 used in the display device 2 of the present embodiment can be applied not only to a direct view type but also to an eyeglass type display such as an HMD. Although description is given by exemplifying the case where the radio interface 10 used in the body unit 1 and the display device 2 is based on the specifications of Bluetooth, the radio interface 10 may be on other modes. By employing a radio interface of a higher speed, it is possible to perform display of large capacity more easily.

Description is given by exemplifying the case where the screen size is 2 inches and the pixel arrangement is 160×RGB×120 pixels in the present embodiment, and the size and shape of the display device 2 is varied depending on the size and shape of the display panel 11 as described above, so that it is necessary to set the most appropriate screen size and the most appropriate number of pixels according to the purpose of use.

Note that, as long as a device used as the display device consumes little power, it is not necessarily limited to the liquid crystal panel, but an EL panel of a self emission type may be used for example. Further, in a case where the display device itself has a memory function like ferroelectric liquid crystal, it is not necessary to regularly refresh the image, so that this is extremely preferable in terms of reduction of the power consumption.

Embodiment 2

Another embodiment according to the display device and the display system of the present invention is described as follows based on FIG. 6 to FIG. 8.

Figure 6:
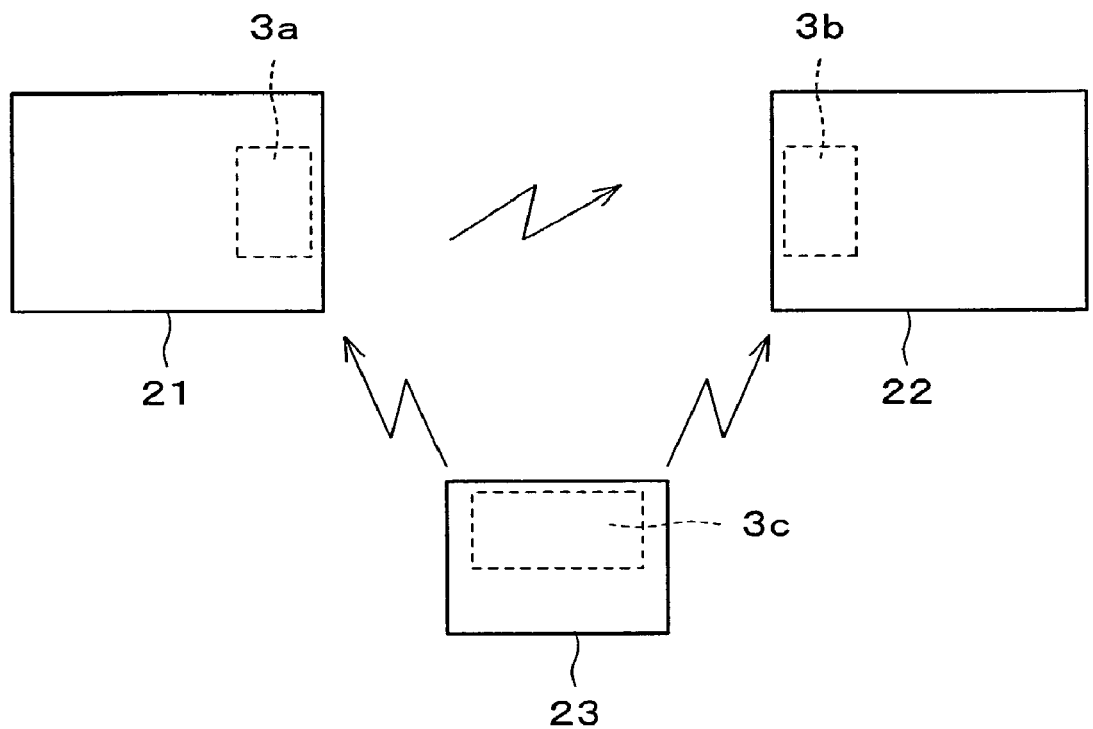
FIG. 6 is a diagram showing an arrangement of a display system of another embodiment of the present invention.

As shown in FIG. 6, a display system of the present embodiment is divided into three parts: a body unit 21, a display device 22, and an operation unit 23. The parts respectively include radio interfaces (radio communication means) 3a, 3b, and 3c.

The display system of the present embodiment is different from the aforementioned display system of Embodiment 1 in that the operation unit 23 is added, and the request/release signal is transmitted from the operation unit 23 to the body unit 21. Other than the differences, the display system of the present embodiment is arranged in the same manner as in the display system of Embodiment 1. The display data displayed in the display device 22 is transferred via radio transmission from the body unit 21 to the display device 22 as in Embodiment 1.

Figure 7:
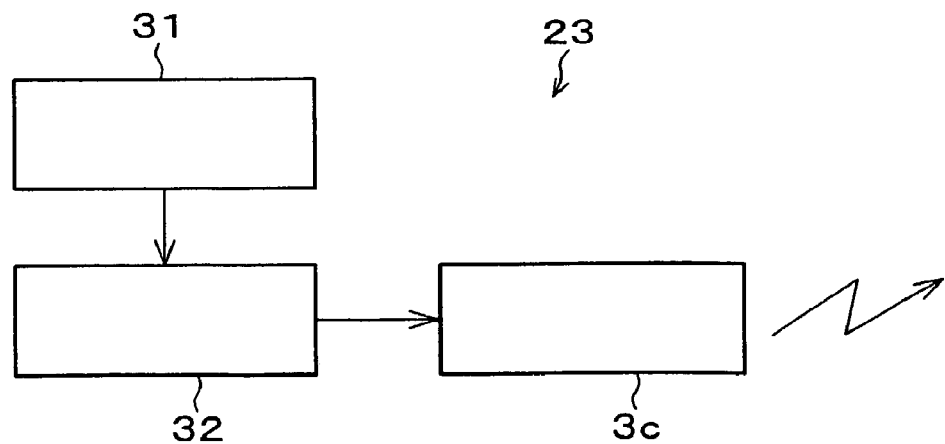
FIG. 7 is a diagram showing an arrangement of an operation unit of the display system shown in FIG. 6.
Figure 8:
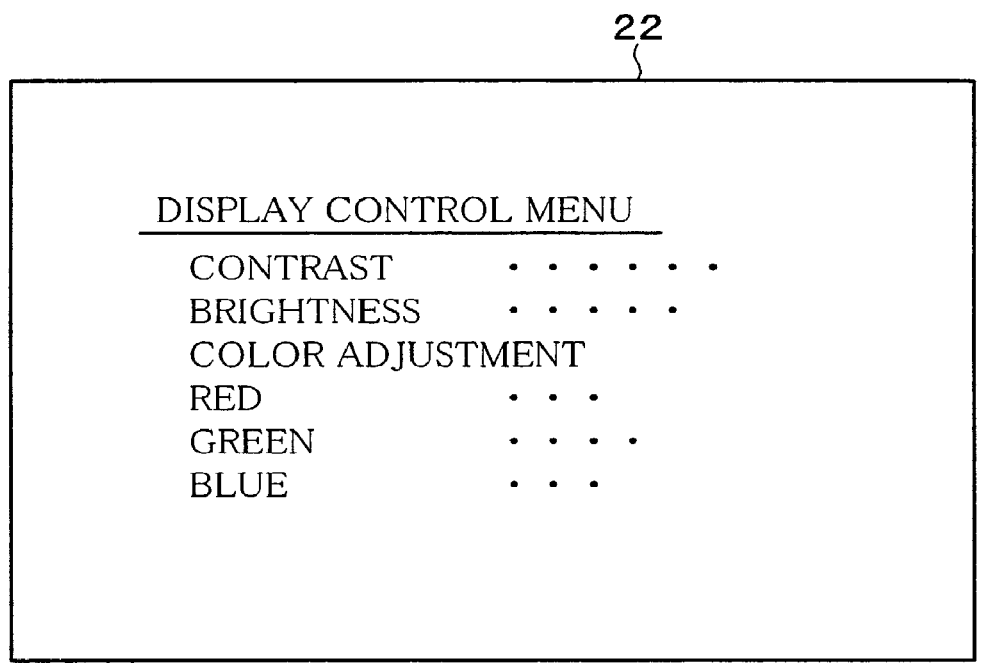
FIG. 8 is an explanatory drawing showing a condition under which menu is displayed in the operation unit shown in FIG. 7.

As shown in FIG. 7, the operation unit 23 includes an operation input section 31, a one-chip microcomputer 32, and the radio interface 3c. Note that, in FIG. 7, a battery required in the operation unit 23 is not shown.

When key input is performed so as to instruct the display device 22 to start display by using the operation input section 31, the key input operation is detected by an input port of the one-chip microcomputer 32, and the request signal is transmitted via the radio interface 3c to the body unit 21 (radio interface 3a) and the display device 22 (radio interface 3b).

When key input is performed so as to instruct the display device 22 to finish display by using the operation input section 31, the key input operation is detected via the input port of the one-chip microcomputer 32, and the release signal is transmitted via the radio interface 3c to the body unit 21 and the display device 22.

The foregoing procedure is written in a ROM of the one-chip microcomputer 32 in the form of program in advance. Note that, transmission and reception of the display data are performed between the body unit 21 and the display device 22 in the same manner as in Embodiment 1.

In a case where the radio interfaces 3a to 3c are Bluetooth, it is possible to switch each of the radio interfaces 3a to 3c to a master or a slave, and it is also possible to use a single slave device with respect to two master devices.

For example, when the operation unit 23 and the body unit 21 are used as the master and the display device 22 is used as the slave, the display device 22 can directly display not only the display data transmitted from the body unit 21 but also the display data transmitted from the operation unit 23, and it is possible to directly operate the display device 22 with the operation unit 23. Further, it is also possible to transfer a display condition of the display device 22 directly to the operation unit 23.

That is, since the display system of the present embodiment has the operation unit 23, the following advantage is obtained: when a display control signal for controlling brightness and contrast etc. of the display device 22 is transmitted not from the body unit 21 but directly from the operation unit 23, the control signal does not pass through the body unit 21, so that it is possible to realize the power saving in the body unit 21. Further, as shown in FIG. 8, the operation condition of the operation unit 23 is displayed in the screen of the display device 22 as a menu, and operations are performed in accordance with the menu, so that the user can operate the display device 22 without watching the operation unit 23. As a result, it is possible to improve the operationality of the operation unit 23.

For example, in a case where the user puts the body unit 21 into a bag etc., and mounts the display device 22 on a sunglass etc., and puts the operation unit 23 into a pocket of trousers etc., the user can select desired content from the menu by means of a dial etc. of the operation unit 23 without pulling out the operation unit 23, so that it is possible to perform the display control of the display device 22. Further, in order to confirm whether or not display parameter data is appropriately exchanged between the operation unit 23 and the display device 22 upon operating the operation unit 23 in the foregoing manner, the display parameter is forwarded from the display device 22 to the operation unit 23 again for reference, so that it is possible to improve the reliability of the display control. The devices are connected to each other in this manner, so that it is possible to arrange the display system that is more freely operable.

Embodiment 3

Still another embodiment according to the display system and the display device of the present invention is described as follows based on FIG. 9 and FIG. 10.

Figure 9:
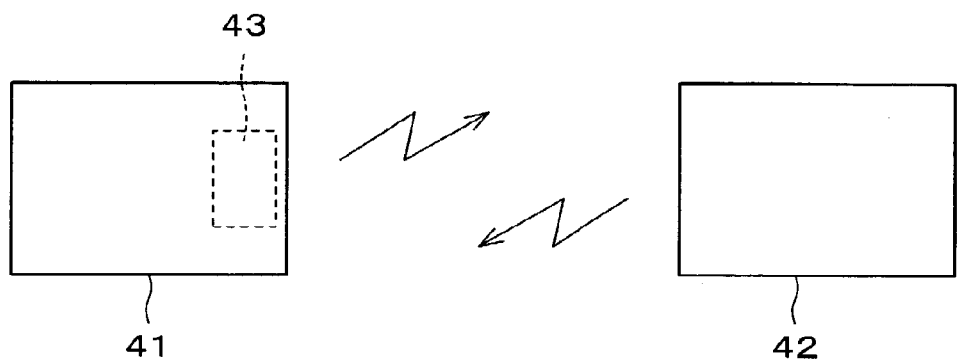
FIG. 9 is a diagram showing an arrangement of a display system of still another embodiment of the present invention.
Figure 10:
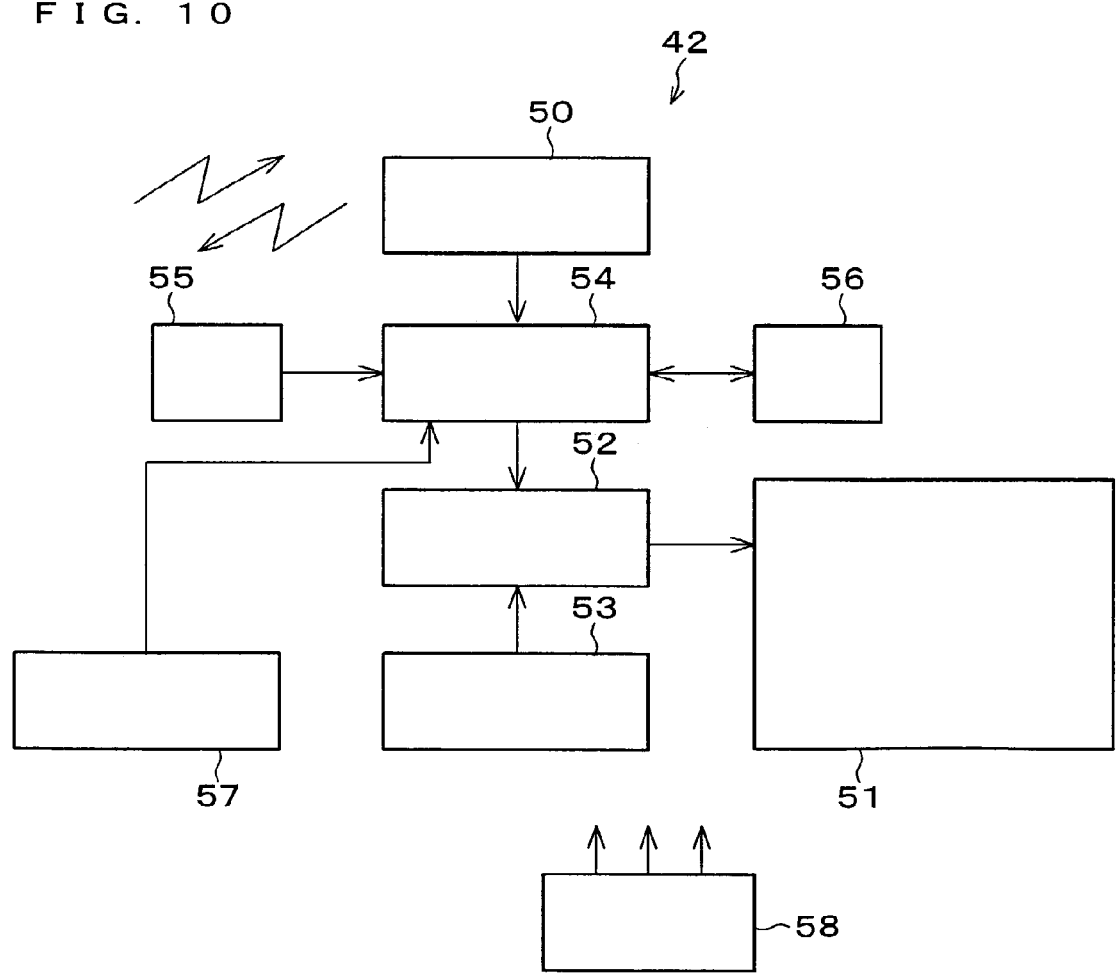
FIG. 10 is a diagram showing an arrangement of a display device of the display system shown in FIG. 9.

As shown in FIG. 9, the display system of the present embodiment is basically arranged in the same manner as in the display system shown in FIG. 1, and includes two parts: a body unit 41 and a display device 42. Information is given and received between both the parts by radio transmission. As a basic operation of the display system of the present embodiment, in response to request transmitted from the display device 42 to the body unit 41, display information corresponding to the request is transmitted from the body unit 41 to the display device 42.

The display system of the present embodiment is different from the display system of Embodiment 1 in that the display device 42 has a frame memory (memory means), and it is not necessary to transmit the display signal from the body unit 41 at a constant cycle.

A data format of the display data used in the display system of the present embodiment may be typical time-series image data as in Embodiment 1, or may be a format of HTML (Hyper Text Markup Language) or XML (Extensible Markup Language) etc.

Here, an arrangement and an operation of the display device 42 of the present embodiment are described. As shown in FIG. 10, the display device 42 includes not only a radio interface 50 based on the specifications of Bluetooth, but also a display panel 51, a display panel 52, a display controller 53, a CPU 54, a ROM 55, a RAM 56, an operation input section 57, a battery 58, and the like.

When the user of the display device 42 performs any operation with respect to the operation input section 57, the operation content is interpreted by the CPU 54. Then, the result of the interpretation is transmitted, as request from the display device 42, via the radio interface 50 to the radio interface 43 of the body unit 41. The transmission content at this time may be, for example, execution of an application in the body unit 41. Further, the operation method may be as follows: for example, the user accesses the body unit 41 via a window displayed in the display device 42 like an operation of a personal computer. Further, the operation method may be as follows: a desired application is selected from such menu window that is used in a cellular phone.

Further, the display data transmitted from the body unit 41 is interpreted via the radio interface 50 by the CPU 54, and is developed so that it can be displayed in the display panel 51, and is written in the display memory 52. The display data written in the display memory 52 is read out by the display controller 53 at a constant cycle, so as to be displayed in the display panel 51. Program for causing the CPU 54 to carry out such series of operations is stored in the ROM 55. Further, the RAM 56 is used as a work memory or a stack memory of the CPU 54.

The display panel 51 is a reflection type TFT liquid crystal panel in which, for example, a screen size is 4 inches, and a pixel arrangement is a VGA format (640×RGB×480 pixels). Since a structure of the reflection type TFT liquid crystal panel is the same as that of a typical TFT liquid crystal panel, detail description is omitted. As long as a device used as the display panel 51 consumes little power, this is not necessarily limited to the liquid crystal panel, but an EL panel of a self emission type may be used for example as in Embodiment 1.

As the display memory 52, an SRAM or a DRAM can be used. In a case of the present embodiment, when there are 64 gray scales for each pixel, the memory capacity for one image is 640×3×480×6 bits. In a case where high speed switching is required, it is desirable to set the capacity of the display memory 52 in the form of two or more images.

The display controller 53 has the same function as a control circuit generally called a display controller or a graphic controller etc., so that detail description is omitted, but the display controller 53 basically reads the display data from the display memory 52 at a constant cycle (for example, vertical frequency) so as to perform display in the display panel 51.

As long as the CPU 54 consumes little power and has a required processing function, the CPU 54 is not particularly limited. For example, it is possible to use an ARM processor, which is a RISC machine of 32 bits, as the CPU 54. Further, in terms of miniaturization of the device, it is more desirable that the ROM 55 and the RAM 56 are mounted on the LSI on which the CPU 54 is mounted.

The operation input section 57 receives input such as typical key input and tablet (pen) input, and instructions are inputted to the operation input section 57 by the user. Further, voice input performed by detecting and recognizing voice of the user may be applied to the operation input section 57.

As described above, the display system of the present embodiment has the display memory 52, so that it is not necessary to transmit the display data from the body unit 41 to the display device 42 at a constant cycle. Thus, it is possible to reduce the power consumption of the display device 42.

Note that, although description is given by exemplifying the case where the radio interface 50 used between the body unit 41 and the display device 42 is based on the specifications of Bluetooth in the present Embodiment 3, the radio interface 50 may be based on other modes. By employing a radio interface of a higher speed, it is possible to perform display of large capacitance at a higher speed.

Embodiment 4

Further another embodiment according to the display device and the display system of the present invention is described as follows based on FIG. 11 to FIG. 12.

Figure 11:
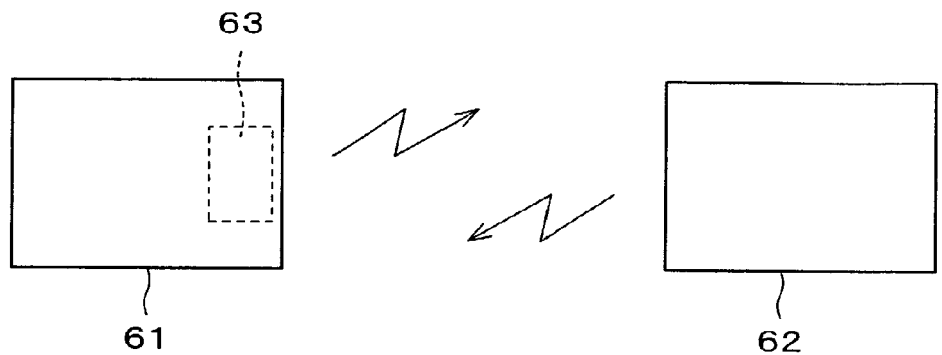
FIG. 11 is a diagram showing an arrangement of a display system of further another embodiment of the present invention.

As shown in FIG. 11, a display system of the present embodiment is arranged basically in the same manner as in the display system shown in FIG. 1, but has two parts: a body unit 61 and a display device 62, and information between both the parts are given and received via a radio communication. As a basic operation of the display system, in response to request transmitted from the display device 62 to the body unit 61, display data corresponding to the request is transmitted from the body unit 61 to the display device 62.

Since the body unit 61 is arranged in the same manner as in Embodiment 1, description thereof is omitted. A data format of the display data used in the display system of the present embodiment may be typical time-series image data as in Embodiment 1, or may be a format of HTML (Hyper Text Markup Language) or XML (Extensible Markup Language) etc.

Further, the display system of the present embodiment is different from Embodiment 1 in that information transmitted from the display device 62 to the body unit 61 contains power source information of the display device 62 itself so as to be transmitted to the body unit 61. Other than the difference, the display system of the present embodiment is arranged in the same manner as in the display system of Embodiment 1.

Here, an arrangement and operations of the display device 62 of the present embodiment are described as follows.

Figure 12:
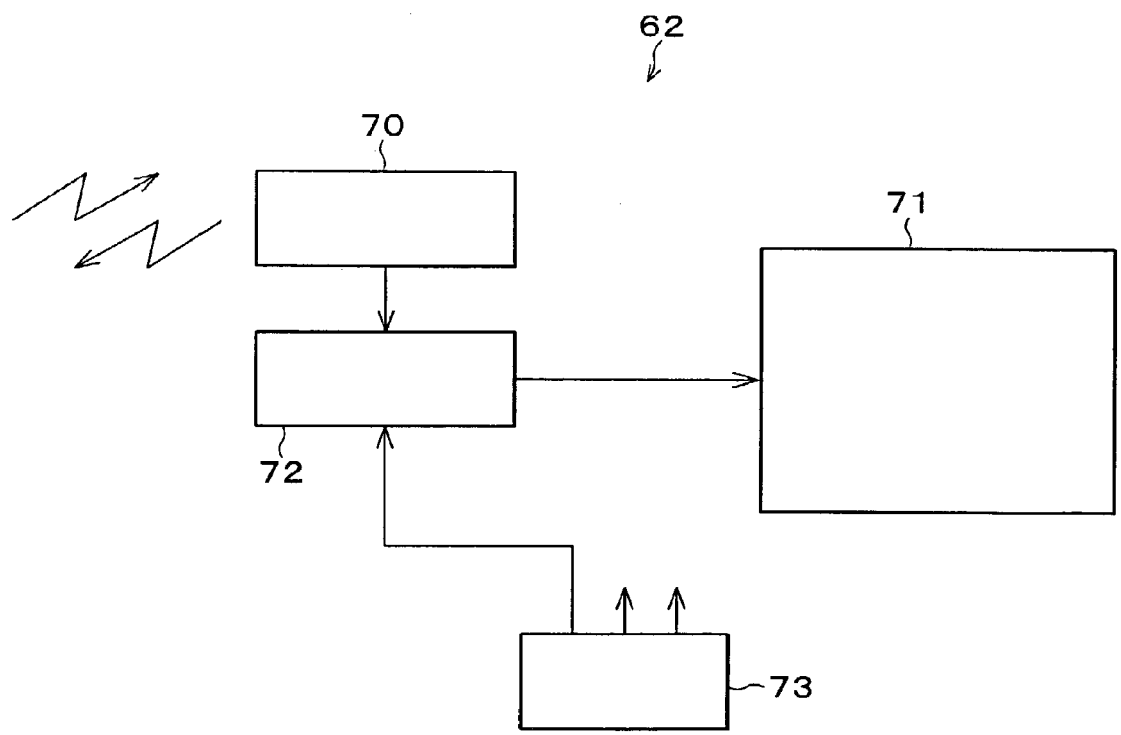
FIG. 12 is a diagram showing an arrangement of a display device of the display system shown in FIG. 11.

As shown in FIG. 12, the display device 62 has not only a radio interface 70 based on the specifications of Bluetooth, but also a display panel 71, a control section 72, a battery 73, and the like.

The control section 72 not only functions as a display controller and as a radio interface, but also detects the power capacity of the battery 73. The power capacity of the battery 73 can be detected by monitoring how much a power voltage value of the battery 73 drops. However, the detection method is not limited to this operation.

As shown in FIG. 4, when a request signal is regularly transmitted from the display device 62, information of the power capacity of the battery 73 that has been detected by the control section 72 may be transmitted in synchronism with the request signal, or may be transmitted at a timing different from that of the request signal. Further, it is possible to use a solar battery as the battery 73.

In accordance with the information of the power capacity of the battery 73 that has been transmitted from the display device 62 via the radio interface 70, an amount of the display data that is to be transmitted to the display device 62 is determined in the body unit 61. That is, when the power capacity of the battery 73 of the display device 62 is small, the amount of the display data that is to be transmitted to the display device 62 is made smaller than an ordinary state, and transmitted via the radio interface 63. Concretely, a frame frequency of the display data is dropped, or a gray scale bit is dropped, or both the operations are performed.

Thus, it is possible to prolong a display data renewal period at a frame or a bit unit of the display panel 71 on the display device 62, so that it is possible to reduce power required in the display device 62. Although this brings about display such that an image of the display device 62 is low in the gray scale or an image lumberingly moves, it is considered that such display condition can be accepted by the user in a case where the battery runs short.

Note that, although description is given by exemplifying the case where the radio interfaces 63 and 70 used between the body unit 61 and the display device 62 are based on the specifications of Bluetooth, the radio interfaces 63 and 70 may be based on other modes. By employing a radio interface of a higher speed, it is possible to perform display of large capacity at a higher speed.

Note that, the present invention is not limited to the wearable device, but this can be applied to (a) a computer device whose body is placed under a desk and whose display and operation unit are placed on the desk for operation, (b) a display system in which data is transmitted from a home server or an operation unit to a wall hung display, (c) an electric paper system in which data is transmitted from a body to a display which functions as an electric paper, and the like.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

According to the display system of the present invention, radio transmission is used as the communication means, and there is no cable, connecting the display device and the body unit, that transfers the display data, so that the user of the device can operate the system freely while watching the display device. As a result, it is possible to improve the workability of the user of the present display system. Further, since there is no wire connection section, using a connection clip, that is provided in a conventional display device, it is possible to simplify a mechanism for securing the strength of the wire connection section.

Further, according to the display system of the present invention, radio transmission is used as the communication means, and there is no cable, connecting the display device and the body unit, that transfers the display data, so that it is possible to freely position the display device and the body unit.

Further, according to the foregoing display system, it is not necessary to provide a complicated processing circuit on the display device, so that it is possible to simplify the arrangement of the display device, and it is possible to miniaturize the display device and to make the display device lighter. Thus, it is possible to improve the workability of the device user compared with a conventional system.

Further, according to the foregoing display device, since there is no wire connection section, using a connection clip, that is provided in a conventional display device, it is possible to simplify a mechanism for securing the strength of the wire connection section.

Further, according to the foregoing display system, in the case where the transfer speed of the display data transmitted from the body unit is higher than a transfer speed at which the display data is displayed, the transmission from the body unit is temporarily stopped and is started again, so that it is possible to keep the most appropriate display condition.

Further, according to the foregoing display system, a predefined condition for performing display in the display panel, that has been transmitted, and the present condition under which display is performed in the display panel are transmitted to the body unit, so that it is possible to confirm whether or not to rectify the display condition by comparing both the conditions. Thus, it is possible to keep the most appropriate display condition.

Further, according to the foregoing display system, a low temperature polycrystal silicon TFT element is an element having a high driving force, so that it is possible to integrally form the signal line driving circuit and the scanning line driving circuit on a surface of the panel in the same process.

Further, according to the foregoing display system, in the case where ferroelectric liquid crystal having a memory function is used in the display device, it is not necessary to transmit the display signal at a constant cycle, and it is not necessary to regularly refresh the image, so that it is possible to reduce the power consumption.

Further, according to the foregoing display system, when a display control signal for controlling brightness and contrast etc. of the display device is transmitted not from the body unit but directly from the operation unit, the control signal does not pass through the body unit, so that it is possible to realize the power saving in the body unit. Further, the operation condition of the operation unit is displayed in the screen of the display device as a menu, and operations are performed in accordance with the menu, so that the user can operate the display device without watching the operation unit. As a result, it is possible to improve the operationality of the operation unit.

Further, according to the foregoing display system, it is not necessary to transmit the display data from the body unit to the display device at a constant cycle, so that it is possible to reduce the power consumption of the display device.

Further, according to the foregoing display system, based on the information of the power capacity, an amount of the display data that is to be transmitted to the display device can be determined. That is, when the power capacity of the display device is small, the amount of the display data that is to be transmitted to the display device is made smaller than an ordinary state so as to be transmitted. Thus, it is possible to prolong an display data renewal period at a frame or a bit unit of the display panel on the display device, so that it is possible to reduce power required in the display device.

Further, according to the foregoing display system, it is possible to arrange Bluetooth by using moderately priced parts, and a receiving/transmitting device based on Bluetooth can switch between master and slave freely, so that the display device can be connected to the body unit and/or the operation unit. As a result, these parts can control each other. Thus, for example, the operation unit can control both the body unit and display device, and the display data can be transmitted from the body unit to the display device.

According to the display device of the present invention, there is no cable that transfers the display data to the vicinity of the display device, so that the device user can operate the system freely while watching the display device. As a result, it is possible to improve the workability. Further, since there is no wire connection section, it is possible to simplify a conventional mechanism for securing the strength of the wire connection section. Further, the display data is transmitted in such format that the display data can be displayed as it is, so that the display device merely displays the display data as it is without processing the display data. As a result, it is not necessary to perform a special operation such as data format conversion etc. Thus, it is possible to simplify the control section contained in the display device, and it is possible to miniaturize the display device and to make the display device lighter.

Further, according to the foregoing display device, the display condition of the display panel is evaluated, and the evaluation result is transmitted to the body unit, and the condition is compared with a predefined condition for performing display, that has been transmitted, so that it is possible to prevent disarrangement of the display that is brought about by receiving excessive display data, and to prevent the display content from largely deteriorating.

Further, according to the foregoing display device, it is possible to determine the amount of the display data that is to be transmitted to the display device in accordance with the information of the power capacity. That is, when the power capacity of the display device is small, the amount of the display data that is to be transmitted to the display device is made smaller than an ordinary state so as to be transmitted. Thus, it is possible to prolong a display data renewal period at a frame or a bit unit of the display panel on the display device, so that it is possible to reduce power required in the display device.

Further, according to the foregoing display device, when a display control signal for controlling brightness and contrast etc. of the display device is transmitted not from the body unit but directly from the operation unit, the control signal does not pass through the body unit, so that it is possible to realize the power saving in the body unit. Further, the operation condition of the operation unit is displayed in the screen of the display device as a menu, and operations are performed in accordance with the menu, so that the user can operate the display device without watching the operation unit. As a result, it is possible to improve the operationality of the operation unit.

Further, according to the display system of the present invention, the body unit is separated from the display device, and both the devices are connected to each other via the radio communication means, so that there is no cable for transferring the display data to the vicinity of the display device. Thus, the device user can perform operations more freely while watching the display device compared with a conventional system, and it is possible to improve the workability of the device user. Further, since the body unit is separated from the display device, the device user can operates the system more smoothly by fixing the body unit whose weight is comparatively heavy on the user's waist and by placing the light display device on a position desired by the user. As a result, it is possible to further improve the workability.

Further, according to the foregoing display system, the display device has no wire connection section for clip connection, so that it is possible to simplify a mechanism for securing the strength of the wire connection section. Further, the display data transmitted from the body unit is displayed as it is, it is the body unit that performs a special operation such as data format conversion etc., so that it is possible to simplify the control section contained in the display device, and it is possible to miniaturize the display device and to make the display device lighter.

Further, according to the foregoing display system, there is no wire connection section of the display device, so that it is possible to simplify a mechanism for securing the strength of the wire connection section. Further, the display device merely displays the display data transmitted from the body unit as it is, and it is the body unit that performs a special operation such as data format conversion etc., so that it is possible to simplify the control section contained in the display device. Due to such arrangement, it is possible to miniaturize the display device and to make the display device lighter. Further, the display condition of the display panel is evaluated, and the evaluation result can be transmitted (fedback) to the body unit, so that it is possible to prevent disarrangement of the display that is brought about by receiving excessive display data, and to prevent the display content from largely deteriorating.

According to the display system of the present invention, the body unit, the display device, and the operation unit by which the device user performs input are separated from each other, and both the devices are connected to each other via the radio communication means, so that there is no cable for transferring the display data to the vicinity of the display device. Thus, the device user can perform operations freely while watching the display device, so that it is possible to improve the workability of the device user. Further, the body unit whose weight is comparatively heavy can be fixed on the user's waist and the light display device can be placed on a position desired by the user, so that the device user can operates the system more smoothly. As a result, it is possible to improve the workability. Further, it is possible to place the operation unit on a position desired by the device user, so that the operationality is improved. The operation unit not only controls the body unit, but also controls the display device directly not via the body unit, so that it is possible to improve a reaction speed in changing display.

According to the display system of the present invention, it is possible to determine the amount of the display data that is to be transmitted to the display device in accordance with the information of the power source capacity. That is, when the power source capacity of the display device is small, the amount of the display data that is to be transmitted to the display device is made smaller than an ordinary state so as to be transmitted. Thus, it is possible to prolong a display data renewal period at a frame or a bit unit of the display panel on the display device, so that it is possible to reduce power required in the display device.

According to the display system of the present invention, when a display control signal for controlling brightness and contrast etc. of the display device is transmitted not from the body unit but directly from the operation unit, the control signal does not pass through the body unit, so that it is possible to realize the power saving in the body unit. Further, the operation condition of the operation unit is displayed in the screen of the display device as a menu, and operations are performed in accordance with the menu, so that the user can operate the display device without watching the operation unit. As a result, it is possible to improve the operationality of the operation unit.

According to the foregoing display system, the receiving section, the transmitting section, and the radio communication means are arranged based on the specifications of Bluetooth, so that the arrangement can be made by using moderately priced parts, and the transferring speed is made higher in the future. Thus, the reception and transmission of the display data can be realized by using the radio communication means. Further, it is possible to switch the receiving/transmitting device, based on Bluetooth, between master and slave, so that it is possible to connect the display device to the body unit and/or the operation unit, so as to cause them to control each other. For example, the operation unit can control both the body unit and the display device, and the display data can be transmitted from the body unit to the display device.

What is claimed is:

1. A display system including:
a body unit for transmitting display data that has been generated; and
a display device for performing display in accordance with the display data that has been transmitted from the body unit, wherein
the body unit and the display device perform communications via radio communication means, and the body unit and the display device are separately wearable,
the display device includes:
a receiving section for receiving the display data that has been transmitted from the body unit via the radio communication means,
a control section for providing a display signal to a display panel in accordance with the display data that has been received, and for controlling the receiving section, and
a transmitting section for causing the control section to evaluate a display condition of the display panel, so as to feedback an evaluation result to the body unit via the radio communication means,
the display data is transmitted from the body unit so as to be directly displayable in the display device without being stored in a frame memory in the display device, and
the body unit transmits the display data directly to the display device via radio communication.

2. The display system as set forth in claim 1, wherein the transmitting section transmits a predefined condition for performing display in the display panel to the body unit via the radio communication means.

3. The display system as set forth in claim 1, wherein a pixel array is provided on a surface of one of panels constituting the display panel, and the pixel array is constituted of a low temperature process polycrystal silicon TFT element.

4. The display system as set forth in claim 1, wherein the display panel itself includes a memory function.

5. The display system as set forth in claim 1, wherein the display device includes an operation unit, and operation content of the operation unit is transmitted via the radio communication means to the body unit.

6. The display system as set forth in claim 1, wherein the display device includes storage means for storing the display data.

7. The display system as set forth in claim 1, wherein the control section detects a power capacity of a driving power source so as to transmit power capacity information to the body unit, and the body unit determines an amount of the display data that is to be transmitted to the display device, in accordance with the power capacity information.

8. The display system as set forth in claim 1, wherein the radio communication means is constituted in accordance with specifications of Bluetooth.

9. A display system including:
a body unit for generating display data; and
a display device for displaying the display data, wherein
the body unit and the display device are separated from each other,
the body unit and the display device are connected to each other by radio communication means,
the body unit transmits the display data directly to the display device by the radio communication means, and
the display device includes:
a display panel for displaying the display data, and a transmitting section for transmitting a display condition of the display panel or a predefined condition for performing display via radio transmission,
a receiving section for receiving the display data that has been transmitted from the body unit via the radio communication means,
a control section for providing a display signal to the display panel in accordance with the display data that has been received, and for controlling the receiving section, and
a transmitting section for causing the control section to evaluate the display condition of the display panel or the predefined condition, so as to feedback an evaluation result to the body unit via the radio communication means,
wherein the display condition or the predefined condition is transmitted from the display device to the body unit.

10. The display system as set forth in claim 9, wherein the radio communication means is constituted in accordance with specifications of Bluetooth.

11. A display device including a display panel for displaying display data, said display device comprising:
- a receiving section for receiving the display data displayed in the display panel via radio transmission;
- a control section for providing a signal to the display panel in accordance with the display data that has been received, and for controlling the receiving section an operation unit by which device a user inputs data, wherein the display device receives a control signal directly from the operation unit; and
- a transmitting section for transmitting a display condition of the display panel or a predefined condition for performing display via radio transmission, and for causing the control section to evaluate the display condition or the predefined condition, so as to feedback an evaluation result to the body unit via the radio transmission,
- wherein the display condition or the predefined condition is transmitted from the display device to a body unit, and the body unit transmits the display data directly to the display device via radio transmission.

12. The display device as set forth in claim 11, wherein an operation condition of the operation unit is displayed on a screen of the display device.

13. The display device as set forth in claim 11, wherein the control section detects a power capacity of the display device, so as to transmit information of the power capacity that has been detected, via the radio transmission.

* * * * *